United States Patent [19]

Wilson et al.

[11] Patent Number: 4,684,502
[45] Date of Patent: Aug. 4, 1987

[54] TOP NOZZLE ALIGNMENT SLEEVE CAPTURE ARRANGEMENT IN A RECONSTITUTABLE FUEL ASSEMBLY

[75] Inventors: John F. Wilson, Murrysville Boro; Robert K. Gjertsen, Monroeville, both of Pa.

[73] Assignee: Westinghouse Electric Corp., Pittsburgh, Pa.

[21] Appl. No.: 746,495

[22] Filed: Jun. 19, 1985

[51] Int. Cl.$^4$ ............................................. G21C 3/32
[52] U.S. Cl. .................................... 376/446; 376/353; 376/364
[58] Field of Search ............... 376/446, 364, 285, 353, 376/365

[56] References Cited

U.S. PATENT DOCUMENTS

| | | | |
|---|---|---|---|
| 4,072,562 | 2/1978 | Sankovich | 376/364 |
| 4,420,457 | 12/1983 | Le Parjwewny | 376/364 |
| 4,534,933 | 8/1985 | Gjertsen | 376/364 |
| 4,551,300 | 11/1985 | Feutrel | 376/364 |

Primary Examiner—Donald P. Walsh

[57] ABSTRACT

An alignment sleeve capture arrangement in the top nozzle of a fuel assembly includes an internal cylindrical wall defining a bore through the upper hold-down plate of the top nozzle below and in communication with a passageway therein through which extends an alignment sleeve of the top nozzle which is used to attach it to the guide thimble of the fuel assembly. The bore has an inside diameter larger than the inside diameter of the passage so as to form a cavity surrounding an upper position of the alignment sleeve which extends axially through the bore as well as the passageway. Also, the arrangement includes an annular shoulder on the upper hold-down plate surrounding the alignment sleeve upper portion and defining an upper limit of the cavity. The shoulder forms a transition between the larger inside diameter of the bore and the smaller inside diameter of the passageway. Additionally, an annular retainer is attached to the upper hold-down plate and spaced below the shoulder. The retainer surrounds the alignment sleeve upper portion and has a neck portion with a central hole through which the alignment sleeve extends and defines a lower limit of the cavity. Lastly, the arrangement includes a bearing ring encircling and attached to the alignment sleeve upper portion and having an outside diameter less than the inside diameter of the cavity and greater than respective inside diameters of the shoulder and retainer neck portion which define the upper and lower limits of the cavity such that the bearing ring can slide within the cavity with the alignment sleeve between the upper and lower limits thereof as the upper hold-down plate moves along the alignment sleeve and will retain the alignment sleeve slidably attached to the hold-down plate when the sleeve is detached from the guide thimble upper end portion. The retainer also has a hollow body portion with one end attached to the hold-down plate and an opposite end integrally connected with the neck portion, the retainer body portion defining a portion of the cavity.

11 Claims, 4 Drawing Figures

TOP NOZZLE ALIGNMENT SLEEVE CAPTURE ARRANGEMENT IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Reconstitutable Nuclear Reactor Fuel Assembly With Unitary Removable Top Nozzle Subassembly" by John M. Shallenberger, assigned U.S. Ser. No. 673,681 and filed Nov. 20, 1984, a continuation-in-part of copending U.S. patent application Ser. No. 457,790 filed Jan. 13, 1983.

2. "Improved Removable Top Nozzle Subassembly For A Reconstitutable Nuclear Fuel Assembly" by John F. Wilson et al, assigned U.S. Ser. No. 701,049 and filed Feb. 12, 1985.

3. "Integral Reusable Locking Arrangement For A Removable Top Nozzle Subassembly Of A Reconstitutable Nuclear Fuel Assembly" by Robert K. Gjertsen et al, assigned U.S. Ser. No. 857,675 and filed Apr. 30, 1986.

4. "Hold-Down Device Of Fuel Assembly Top Nozzle Employing Leaf Springs" by Robert K. Gjertsen et al, assigned U.S. Ser. No. 729,607 and filed May 2, 1985.

BACKGROUND OF THE INVENTION

1. Field of the Invention

The present invention relates generally to reconstitutable fuel assemblies for nuclear reactors and, more particularly, is concerned with a top nozzle incorporating an alignment sleeve capture arrangement which eliminates all loose components during top nozzle removal and replacement in carrying out reconstitution of the fuel assembly.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle.

Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of coil springs surrounding the guide thimbles, such as seen in U.S. Pat. Nos. 3,770,583 and 3,814,667 to Klumb et al and 4,269,661 to Kmonk et al, and in the first three patent applications cross-referenced above. Also, as exemplified by the fourth patent application cross-referenced above, recently it has been proposed that leaf springs be used in place of the coil springs.

Due to occasional failure of some fuel rods during normal reactor operation and in view of the high costs associated with replacing fuel assemblies containing failed fuel rods, the trend is currently toward making fuel assemblies reconstitutable in order to minimize operating and maintenance expenses. Conventional reconstitutable fuel assemblies incorporate design features arranged to permit the removal and replacement of individual failed fuel rods. Reconstitution has been made possible by providing a fuel assembly with a removable top nozzle. The top nozzle is mechanically fastened in some instances, such as illustrated in the above cross-referenced applications, by a threaded arrangement to the upper end of each control rod guide thimble, and the top nozzle can be removed remotely from an irradiated fuel assembly while it is still submerged in a neutron-absorbing liquid. Once removal and replacement of the failed fuel rods have been carried out on the irradiated fuel assembly submerged at a work station and after the top nozzle has been remounted on the guide thimbles of the fuel assembly, the reconstituted assembly can then be reinserted into the reactor core and used until the end of its usefuel life.

While the proposed removable top nozzle designs of the above cross-referenced patent applications have proved to be highly satisfactory ways to facilitate reconstitution of fuel assemblies, the top nozzle arrangement of the fourth cross-referenced application does require handling of loose parts for disassembly and replacement of the top nozzle, namely, the enlarged nuts threaded on the upper end portions of the guide thimbles which upper end portions can take the form of alignment sleeves threaded on the guide thimbles. Consequently, a need exists for a different approach to top nozzle attachment, one with the objective of removing and reattaching the top nozzle without creating any loose parts and yet maintains all of the desirable features of both the leaf spring and coil spring hold-down device designs of the above cross-referenced patent applications.

SUMMARY OF THE INVENTION

The present invention provides an alignment sleeve capture arrangement for the removable top nozzle designed to satisfy the aforementioned needs. While not so limited, the present invention is particularly suitable for incorporation in a top nozzle design in which the upper hold-down plate and lower adapter plate have no slidable interconnection, such as in the fourth cross-referenced application. In the absence of such interconnection, the upper and lower plates come apart upon disconnection and removal of the top nozzle from the guide thimbles of the fuel assembly. And, when alignment sleeves are used to threadably attach the top nozzle to the guide thimbles, they become separable from both upper and lower plates upon detachment of the top nozzle. The present invention eliminates any loose parts during top nozzle removal and replacement by providing an arrangement which captures the alignment sleeves within the upper hold-down plate such that they are removed with the upper plate.

Accordingly, the present invention is set forth in a reconstitutable fuel assembly having at least one control rod guide thimble and a top nozzle, with the guide thimble including an upper end portion and the top nozzle including an upper hold-down plate having at least one passageway, at least one tubular alignment sleeve slidably extending through the passageway and being attachable to and detachable from the guide thimble upper end portion and means supported on the guide thimble upper end portion which, in turn, yieldably mounts the upper hold-down plate for relative movement along the alignment sleeve. The present invention is an alignment sleeve capture arrangement comprising: (a) means defining an annular cavity through the upper hold-down plate and in communication with the passageway therein, the cavity surrounding an upper portion of the alignment sleeve which extends axially through the cavity and the passageway; (b) upper means on the upper hold-down plate surrounding the alignment sleeve upper portion and defining an upper limit of the cavity; (c) lower means on the upper hold-down plate surrounding the alignment sleeve upper portion, spaced below the upper limit defining means, and defining a lower limit of the cavity; and (d) enlarged means attached on the alignment sleeve upper portion and having an outside diameter greater than respective inside diameters of the upper and lower cavity limit defining means but less than the inside diameter of the cavity such that the enlarged means can slide within the cavity with the alignment sleeve between the upper and lower limits thereof as the upper hold-down plate moves along the alignment sleeve and will retain the alignment sleeve slidably attached to the hold-down plate when the sleeve is detached from the guide thimble upper end portion.

More particularly, the upper cavity limit defining means is a shoulder defined in the upper hold-down plate which forms a transition between the larger inside diameter of the cavity and a smaller inside diameter of the passageway. Also, the lower cavity limit defining means is a retainer attached to the upper hold-down plate and surrounding the alignment sleeve upper portion, with the retainer having a neck portion with a central hole through which the alignment sleeve extends and defining the inside diameter of the limit defining means which is less than the outside diameter of the enlarged means. Additionally, the retainer has a hollow body portion with one end attached to the hold-down plate and an opposite end integrally connected with the neck portion. The retainer body portion defines a portion of the cavity.

Still further, the enlarged means is a bearing ring encircling and attached to the alignment sleeve upper portion. The bearing ring has an internal groove into which a section of the alignment sleeve upper portion is bulge fitted for rigidly connecting the ring to the alignment sleeve. The upper portion of the alignment sleeve has a reduced diametric size compared to a lower portion of the alignment sleeve which defines a radially extending ledge at the transition between the alignment sleeve portions on which the bearing ring is seated.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
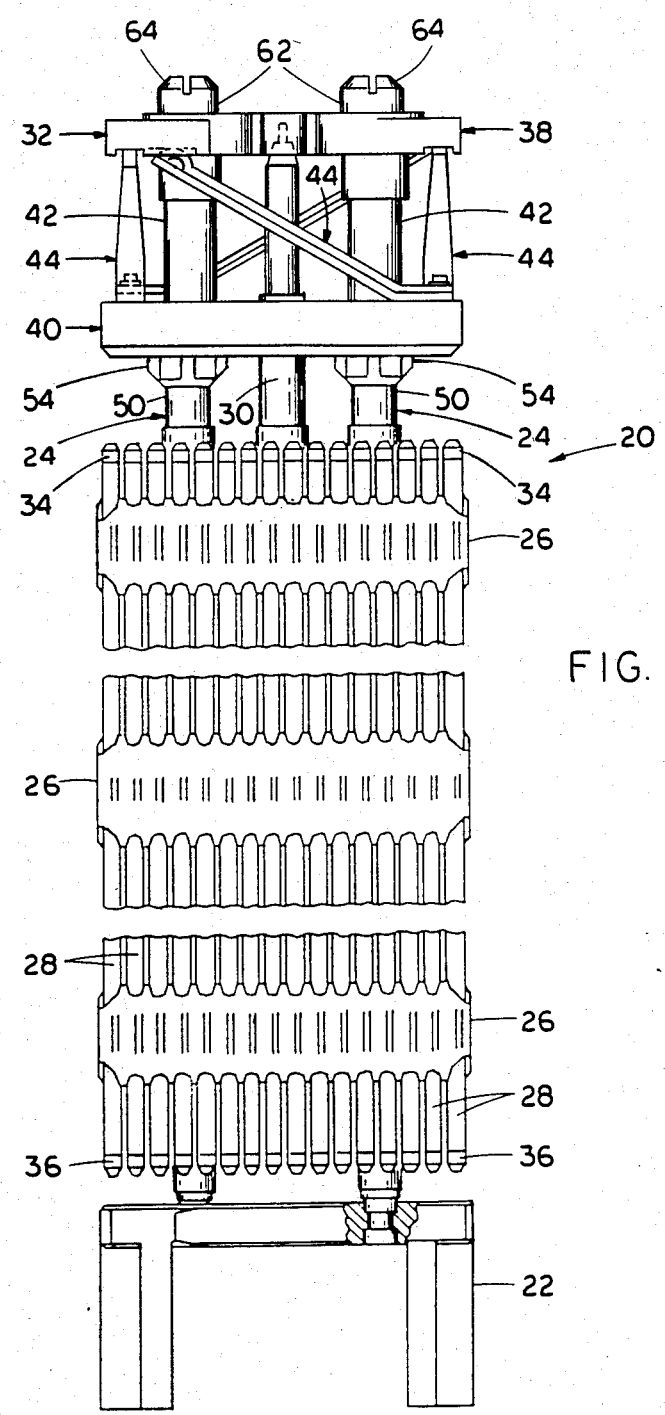
FIG. 1 is an elevational view, with parts broken away for clarity, of a reconstitutable fuel assembly having a top nozzle alignment sleeve capture arrangement constructed in accordance with the principles of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a nuclear reactor fuel assembly, represented in vertically foreshortened form and being generally designated by numeral 20. Basically, the fuel assembly 20 includes a lower end structure or bottom nozzle 22 for supporting the assembly on the lower core plate (not shown) in the core region of a reactor (not shown), and a number of longitudinally extending guide tubes or thimbles 24 which project upwardly from the bottom nozzle 22. The assembly 20 further includes a plurality of transverse grids 26 axially spaced along the guide thimbles 24 and an organized array of elongated fuel rods 28 transversely spaced and supported by the grids 26. Also, the assembly 20 has an instrumentation tube 30 located in the center thereof and an upper end structure or top nozzle 32 attached to the upper ends of the guide thimbles 24 in accordance with the present invention which will be fully described below. With such an arrangement of parts, the fuel assembly 10 forms an integral unit capable of being conventionally handled without damaging the assembly parts.

As mentioned above, the fuel rods 28 in the array thereof in the assembly 20 are held in spaced relationship with one another by the grids 26 spaced along the fuel assembly length. Each fuel rod 28 includes nuclear fuel pellets (not shown) and is closed at its opposite ends by upper and lower end plugs 34,36. The fuel pellets composed of fissile material are responsible for creating the reactive power of the reactor. A liquid moderator/coolant such as water, or water containing boron, is pumped upwardly through the guide thimbles 24 and along the fuel rods 28 of the fuel assemmbly 20 in order to extract heat generated therein for the production of useful work.

To control the fission process, a number of control rods (not shown) are reciprocally movable in the guide thimbles 24 located at predetermined positions in the fuel assembly 20. Since the control rods are inserted into the guide thimbles 24 from the top of the fuel assembly 20, the placement of the components forming the top nozzle 32 and the arrangement of parts to be described below for connecting the top nozzle to the guide thimbles must accommodate the movement of the control rods into the guide thimbles from above the top nozzle.

Components of the Top Nozzle

Figure 2:
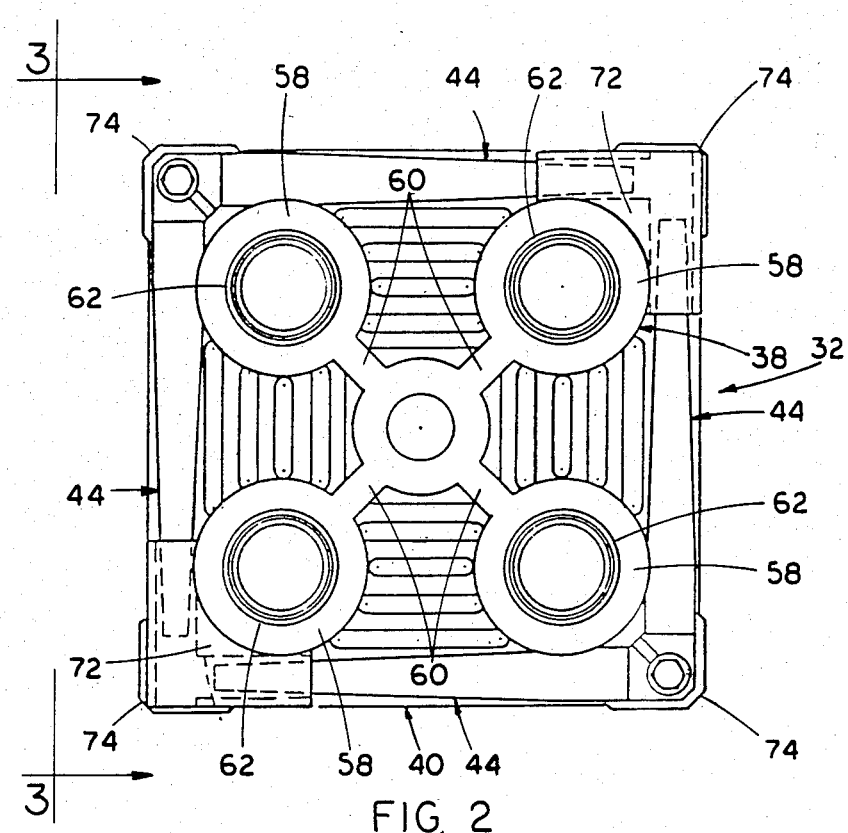
FIG. 2 is an enlarged top plan view of the fuel assembly as seen along line 2—2 of FIG. 1.
Figure 3:
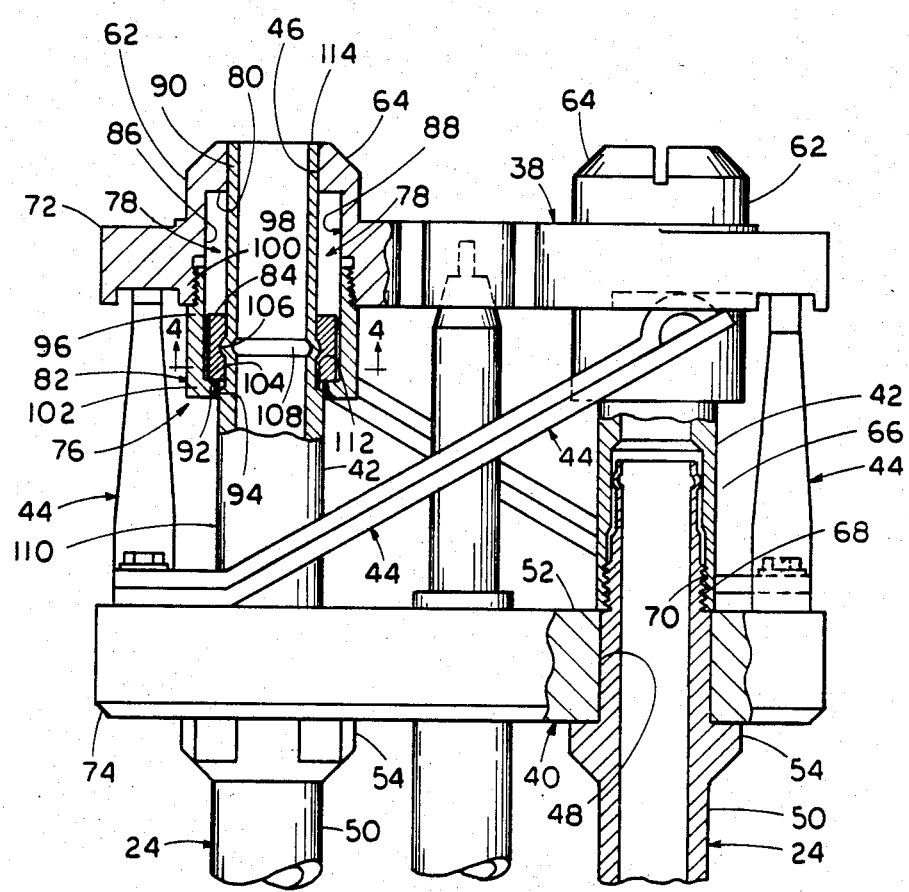
FIG. 3 is an enlarged fragmentary elevational view, with portions broken away and sectioned, of the fuel assembly top nozzle as taken along line 3—3 of FIG. 2.

Turning now to FIGS. 1 to 3, there is shown an exemplary embodiment of the top nozzle 32 which is mounted on the guide thimbles 24 of the fuel assembly 20. The top nozzle 32 basically includes an upper hold-down plate 38, a lower adapter plate 40, a plurality of tubular alignment sleeves 42 disposed between the upper and lower plates 38,40, and a plurality of leaf spring assemblies 44 extending in inclined fashion between the upper and lower plates 38,40 along the peripheries thereof. The upper hold-down plate 38 has a plurality of passageways 46 defined therethrough, while the lower adapter plate 40 has a plurality of openings 48, the passageways 46 and openings 48 being arranged in respective patterns which are matched to that of the guide thimbles 24 of the fuel assembly 20.

More particularly, upper end portions 50 of the guide thimbles 24 extend upwardly through the openings 48 in the lower adapter plate 40 and above the upper surface 52 thereof. A plurality of lower retainers 54 are attached, such as by brazing, to the guide thimbles 24 below the lower adapter plate 40 for limiting downwaard slidable movement of the adapter plate relative to the guide thimbles and thereby supporting the adapter plate on the guide thimbles with the upper end portions 50 thereof extending above the adapter plate. Each lower retainer 54 on one guide thimble 24 has a series of scallops formed on its periphery which are aligned with those of the fuel rods 28 grouped about the respective one guide thimble so that the fuel rods may be removed and replaced during reconstitution of the fuel assembly 20.

The upper hold-down plate 38 is composed of an array of hubs 58 and ligaments 60 which extend between and interconnect the hubs. Further, a plurality of upstanding bosses 62 are integrally connected with, and extend above, the respective hubs 5. Each boss 62 has one of the passageways 46 defined therein. Additionally, each boss 62 is of a cross-sectional size adapted to interfit within one of a plurality of holes (not shown) formed in the upper core plate (not shown) of the reactor core. The upper circumferential edge 64 of each boss 62 is chamfered for mating with a complementarily chambered edge on the upper core plate at the entrance of the holes defined therein. Edges having such shapes act as guiding surfaces which facilitate alignment and insertion of the respective bosses 62 into the corresponding holes in the upper core plate during installation of the fuel assembly 20 within the reactor core.

Each of the alignment sleeves 42 extends between an aligned pair of the passageways 46 and openings 48 of the upper and lower plates 38,40. As depicted at the right side of FIG. 3, there are threaded features on each sleeve 42 and on the upper end portion 50 of each guide thimble 24 for attaching the sleeve and guide thimble together. Also, there is a reusable locking arrangement, generally designated as 66, integrally associated with both the sleeve 42 and the guide thimble upper end portion 50 for locking the attached sleeve and guide thimble together. The reusable locking arrangement 66 comprises the invention disclosed and claimed in the third patent application cross-referenced above and need not be described in detail herein for an understanding of the subject matter of the present invention which will be described below.

With respect to the threaded features on the guide thimble 24 and sleeve 42, the upper end portion 50 of the guide thimble has an annular externally threaded section 68, whereas the alignment sleeve has a lower annular internally threaded section 70. The sleeve 42 is mounted through the passageway 46 of the upper hold-down plate boss 62 for slidable movement relative thereto and rotatable movement relative to the guide thimble upper end portion 50 for threading and unthreading its internally threaded section 70 onto and from the externally threaded section 68 of the guide thimble upper end portion in order to attach and detach the top nozzle 32 onto and from the guide thimble 24. The sleeve 42 is hollow so that, in addition to accommodating insertion of a control rod through it, a suitable tool (not shown) can be inserted into the sleeve for gripping it internally to rotate it in either direction for threading on and unthreading from the upper end portion 50 of the guide thimble 24. When threaded on the guide thimble upper end portion 50, the sleeve 42 cooperates with the lower retainer 54 to clamp the adapter plate 40 therebetween.

Finally, the upper hold-down plate 38 and the lower adapter plate 40 each have a rectangular configuration with a plurality of corners (preferably four in number) 72 and 74 defined on respective peripheries thereof being opposite to and vertically aligned with one another. The leaf spring assemblies 44 are interposed between the upper hold-down plate 38 and the lower adapter plate 40 so as to yieldably support the movable upper plate above the stationary lower plate. The leaf spring assemblies 44 are arranged along the respective peripheries of the upper and lower plates 38,40 and engaged with the plates adjacent predetermined ones of the peripheral corners 72,74 thereon. The arrangement of the leaf spring assemblies 44 comprises the invention disclosed and claimed in the fourth patent application cross-referenced above and need not be described in detail herein for an understanding of the subject matter of the present invention which will be described below. While the use of leaf springs is illustrated herein, the present invention can just as readily be used in top nozzles employing coil springs.

Alignment Sleeve Capture Arrangement

Referring now to the left side of FIG. 3, there is shown in the top nozzle 32 of the fuel assembly 20 the capture arrangmeent of the present invention, being generally designated by the numeral 76, for retaining each of the alignment sleeves 42 in slidable engagement with the upper hold-down plate 38 of the top nozzle when it is detached from one of the guide thimbles 24. The capture arrangement basically includes an annular cavity 78, an annular shoulder 80, an annular retainer 82 and a bearing ring 84.

A continuous internal cylindrical wall 86 defines a bore 88 through the hub 58 and partially through the boss 62 of the upper hold-down plate 38 below and in communication with the passageway 46 in the boss. The alignment sleeve 42 used to attach the top nozzle 32 to each of the guide thimbles extends through the bore 88 as well as the passageway 46. The bore 88 has an inside diameter larger than the inside diameter of the passageway 46 so as to form the annular cavity 78 surrounding an upper portion 90 of the alignment sleeve 42 which extends axially through the bore 88 and passageway 46.

Also, the annular shoulder 80 of the capture arrangement 76 which forms a transition on the upper plate 38 between the larger inside diameter of the bore 88 and the smaller inside diameter of the passageway 46 surrounds the alignment sleeve upper portion 90 and defines an upper limit of the annular cavity 78. The annular retainer 82 is threadably attached to the upper hold-down plate 38 and spaced below the shoulder 80. Being in the shape of a collar, the retainer 82 surrounds the alignment sleeve upper portion 90 and has a neck portion 92 with a central hole 94 through which extends the alignment sleeve 42. The neck portion 92 defines a lower limit of the annular cavity 78. The retainer 82 also has a hollow body portion 96 with one end 98 being externally threaded for connection to an internally threaded lower end 100 of the continuous wall 86 of the upper plate 38 defining the bore 88. An opposite end 102 of the retainer body portion 98 is integrally connected with the neck portion 92, and the retainer body portion defines a lower portion of the annular cavity 78. It is readily apparent that the positions of the annular shoulder 80 and retainer 82 as the upper and lower limits of the annular cavity 78 can be reversed. For assembling the alignment sleeve capture arrangement 76 it is only necessary that one of them be made detachable from the upper hold-down plate 38.

Figure 4:
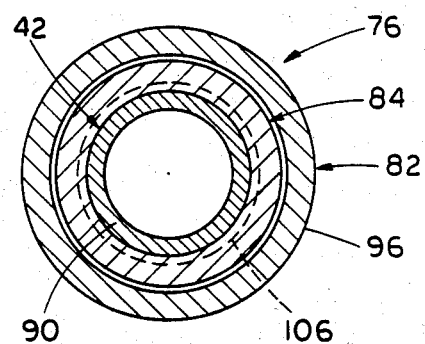
FIG. 4 is a cross-sectional view of the alignment sleeve capture arrangement of the present invention as taken along line 4—4 of FIG. 3.

Lastly, as also seen in FIG. 4, the bearing ring 84 of the capture arrangement 76 encircles and is attached to the alignment sleeve upper portion 90. The bearing ring 84 has a central passage 104 and an internal groove 106 which opens into the passage and into which an annular section 108 of the alignment sleeve upper portion 90 is bulge fitted for rigidly connecting the ring to the alignment sleeve. The upper portion 90 of the alignment sleeve 42 has a reduced diametric size compared to a lower portion 110 thereof such that a radially extending ledge 112 is defined at the transition between the alignment sleeve portions 90,110 on which the bearing ring 84 is also seated. The ring 84 has an outside diameter less than the inside diameter of the annular cavity 78 and greater than respective inside diameters of the annular shoulder 80 and retainer neck portion 92 which define the upper and lower limits of the cavity. Therefore, on the one hand, the bearing ring 84 can slide, along with the alignment sleeve 42 relative to the upper hold-down plate 38, within the cavity 78 between the upper and lower limits thereof as the upper hold-down plate 38 moves along the alignment sleeve 42 when the sleeve is attached to the guide thimble upper end portion 50. On the other hand, the bearing ring 84 will retain the alignment sleeve 42 slidably attached to the hold-down plate 38 when the sleeve 42 is detached from the guide thimble upper end portion 50.

To assembly the alignment sleeve capture arrangement 76, first and the lower adapter plate 40 of the top nozzle 32 with the leaf spring assemblies 44 installed thereon is lowered onto the guide thimbles 24 and the alignment sleeves 42 are threaded onto the upper end portions 50 of the guide thimbles. (This initial assembly is carried out in the shop, not at a work station or in the core.) Next, the retainers 82 are slid down over the installed alignment sleeves 42 and then the bearing rings 84 are inserted on the sleeves to their rest positions on the ledges 112 thereof. After the rings 84 are bulge fitted to the sleeves 42 by a suitable tool inserted into the sleeves, the retainers 82 can be threaded into the upper hold-down plate 38.

As shown in FIG. 3, the leaf spring assemblies 44 are not compressed and the bearing ring 84 is engaged with the lower limit of the cavity 78, that being the retainer neck portion 92, However, when the upper core plate (not shown) is placed over the fuel assembly 20, it presses on the upper hold-down plate 38 and compresses or deflects the spring assemblies 44. The upper hold-down plate 38 thus slides downwardly relative to each alignment sleeve 42 and the retainer 80 and bearing ring 82 move away from one another, the ring becoming displaced toward the upper limit of the cavity 78. The top end 114 of the sleeve upper portion 90 extends upwardly through the passageway 46 and above the boss 62 on the upper hold-down plate 38.

It will be readily understood that the configuration of the annular cavity 78 allows concurrent rotation and vertical axial movement of the alignment sleeve 42 for threading it on and from the guide thimble upper end portion 50 to respectively attach and detach the sleeve on and from the guide thimble. Such concurrent rotation and vertical movement is allowed all the while the ring 84 on the sleeve 42 remains captured within the cavity 78.

To remove the top nozzle 32 for reconstituting the fuel assembly 20, first, pressure is applied on the upper hold-down plate 38. This can be done either by a suitable fixture (not shown) or just by inserting a threaded bolt (not shown) through the upper hold-down plate 38 and threading it into a complementarily threaded bore (not shown) in the lower adapter plate 40. The alignment sleeves 42 are then rotated to unthread them from the guide thimbles 24. When the fixture is used, the upper plate 38 is then removed separately with the alignment sleeves 42 being taken with them in view of their captured condition. Then, the lower adapter plate 40 can be lifted off the guide thimbles 24. However, if the threaded bolts are used, the upper and lower plate 38,40 can be lifted off as unitary subassembly with the sleeves 42 still being retained in the upper plate.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely an exemplary embodiment thereof.

We claim:

1. In a reconstitutable fuel assembly having at least one control rod guide thimble and a top nozzle, said guide thimble including an upper end portion, said top nozzle including an upper hold-down plate having at least one passageway, at least one tubular alignment sleeve slidably extending through said passageway and being attachable to and detachable from said guide thimble upper end portion and means supported on said guide thimble upper end portion which, in turn, yieldably mounts said upper hold-down plate for relative movement along said alignment sleeve, an alignment sleeve capture arrangement comprising:
   (a) means defining a cavity through said upper hold-down plate and in communication with said passageway therein, said cavity surrounding an upper portion of said alignment sleeve which extends axially through said cavity and said passageway;
   (b) upper means on said upper hold-down plate surrounding said alignment sleeve upper portion and defining an upper limit of said cavity;
   (c) lower means on said upper hold-down plate surrounding said alignment sleeve upper portion, spaced below said upper limit defining means, and defining a lower limit of said cavity, one of said upper and lower cavity limit defining means being releasably attached to said upper hold-down plate for facilitating assembling and dissembling of said top nozzle; and
   (d) enlarged means attached on said alignment sleeve upper portion and having an outside diameter greater than respective inside diameters of said upper and lower cavity limit defining means but less than the inside diameter of said cavity such that said enlarged means can slide within said cavity with said alignment sleeve between said upper and lower limits thereof as said upper hold-down plate moves along said alignment sleeve and will retain said alignment sleeve slidably attached to said hold-down plate when said sleeve is detached from said guide thimble upper end portion.

2. The alignment sleeve capture arrangement as recited in claim 1, wherein said upper cavity limit defining means is a shoulder defined in said upper hold-down plate which forms a transition between said larger inside diameter of said cavity and a smaller inside diameter of said passageway.

3. The alignment sleeve capture arrangement as recited in claim 1, wherein said lower cavity limit defining means is a retainer attached to said upper hold-down plate and surrounding said alignment sleeve upper portion, said retainer having a neck portion with a central hole through which said alignment sleeve extends and defining said inside diameter of said limit defining means which is less than said outside diameter of said enlarged means.

4. The alignment sleeve capture arrangement as recited in claim 3, wherein said retainer also has a hollow body portion with one end releasably attached to said hold-down plate and an opposite end integrally connected with said neck portion, said retainer body portion defining a portion of said cavity.

5. The alignment sleeve capture arrangement as recited in claim 1, wherein said enlarged means is a bearing ring encircling and attached to said alignment sleeve upper portion.

6. The alignment sleeve capture arrangement as recited in claim 5, wherein said bearing ring has an internal groove into which a section of said alignment sleeve upper portion is bulge fitted for rigidly connecting said ring to said alignment sleeve.

7. The alignment sleeve capture arrangement as recited in claim 5, wherein said upper portion of said alignment sleeve has a reduced diametric size compared to a lower portion of said alignment sleeve which defines a radially extending ledge at the transition between said alignment sleeve portions on which said bearing ring is seated.

8. In a reconstitutable fuel assembly having at least one control rod guide thimble and a top nozzle, said guide thimble including an upper end portion, said top nozzle including an upper hold-down plate having at least one passageway, a lower adapter plate having at least one opening, at least one tubular alignment sleeve extending between said upper and lower plates in alignment with said guide thimble upper end portion and said passageway and opening of said upper and lower plates, said guide thimble upper end portion extending through said lower adapter plate opening and said alignment sleeve slidably extending through said upper hold-down plate passageway, said alignment sleeve being attachable and detachable to and from said guide thimble upper end portion and cooperable with said adapter plate and guide thimble upper end portion for removably mounting said top nozzle on said guide thimble, and spring means extending between said upper hold-down plate and said lower adapter plate for yieldably disposing said upper and lower plates in a spaced relationship and yieldably mounting said upper plate for relative movement along said alignment sleeve, an alignment sleeve capture arrangement comprising:

(a) means defining a bore through said upper hold-down plate below and in communication with said passageway therein, said bore having an inside diameter larger than the inside diameter of said passageway so as to form a cavity surrounding an upper portion of said alignment sleeve which extends axially through said bore and said passageway;

(b) an annular shoulder on said upper holddown plate surrounding said alignment sleeve upper portion and defining an upper limit of said cavity, said shoulder forming a transition between said larger inside diameter of said bore and said smaller inside diameter of said passageway;

(c) an annular retainer releasably attached to said upper hold-down plate and spaced below said shoulder which defines said upper limit of said cavity, said retainer surrounding said alignment sleeve upper portion and having a neck portion with a central hole through which said alignment sleeve extends and defining a lower limit of said cavity; and (d) a bearing ring encircling and attached to said alignment sleeve upper portion and having an outside diameter less than the inside diameter of said cavity and greater than respective inside diameters of said shoulder and retainer neck portion which define said upper and lower limits of said cavity such that said bearing ring can slide within said cavity with said alignment sleeve between said upper and lower limits thereof as said upper hold-down plate moves along said alignment sleeve and will retain said alignment sleeve slidably attached to said hold-down plate when said sleeve is detached from said guide thimble upper end portion.

9. The alignment sleeve capture arrangement as recited in claim 8, wherein said retainer also has a hollow body portion with one end releasably attached to said hold-down plate and an opposite end integrally connected with said neck portion, said retainer body portion defining a portion of said cavity.

10. The alignment sleeve capture arrangement as recited in claim 8, wherein said bearing ring has an internal annular groove into which an annular section of said alignment sleeve upper portion is bulge fitted for rigidly connecting said ring to said alignment sleeve.

11. The alignment sleeve capture arrangement as recited in claim 8, wherein said upper portion of said alignment sleeve has a reduced diametric size compared to a lower portion of said alignment sleeve which defines a radially extending ledge at the transition between said alignment sleeve portions on which said bearing ring is seated.

* * * * *